United States Patent
Kjaer et al.

(10) Patent No.: US 9,459,001 B2
(45) Date of Patent: Oct. 4, 2016

(54) ILLUMINATION DEVICE WITH MULTI-LAYERED HEAT SINK

(75) Inventors: Jens Søren Kjaer, Aalborg Ø (DK); Dennis Jørgensen, Rønde (DK)

(73) Assignee: MARTIN PROFESSIONAL A/S, Aarhus N. (DK)

( * ) Notice: Subject to any disclaimer, the term of this patent is extended or adjusted under 35 U.S.C. 154(b) by 203 days.

(21) Appl. No.: 14/125,280

(22) PCT Filed: Jun. 8, 2012

(86) PCT No.: PCT/DK2012/050196
§ 371 (c)(1),
(2), (4) Date: Mar. 21, 2014

(87) PCT Pub. No.: WO2012/167798
PCT Pub. Date: Dec. 13, 2012

(65) Prior Publication Data
US 2014/0218969 A1 Aug. 7, 2014

(30) Foreign Application Priority Data
Jun. 10, 2011 (DK) .................................. 2011 70291

(51) Int. Cl.
*F21V 29/00* (2015.01)
*F21V 5/00* (2015.01)
(Continued)

(52) U.S. Cl.
CPC ............ *F21V 29/2262* (2013.01); *F21V 5/007* (2013.01); *F21V 29/30* (2013.01);
(Continued)

(58) Field of Classification Search
CPC ...... F21V 29/503; F21V 29/70; F21V 29/83; F21Y 2105/001; F21Y 2105/005; H01L 25/0657; H01L 25/0756
See application file for complete search history.

(56) References Cited

U.S. PATENT DOCUMENTS 7,810,951 B1 * 10/2010 Lee .......................... F21V 21/30
362/218
2003/0223236 A1 12/2003 Wu
(Continued)

FOREIGN PATENT DOCUMENTS

| JP | 2006049026 A | 2/2006 |
|---|---|---|
| WO | 2009091562 A2 | 7/2009 |
| WO | 2010069327 A1 | 6/2010 |

OTHER PUBLICATIONS

International Search Report, PCT/DK2012/050196, Aug. 14, 2012.
(Continued)

*Primary Examiner* — Peggy Neils
*Assistant Examiner* — Alexander Garlen
(74) *Attorney, Agent, or Firm* — Artegis Law Group, LLP (57) ABSTRACT

The present invention relates to an illumination device where a number of light sources are arranged on a heat sink and adapted to emit light in substantially the same direction. The heat sink comprises a first cooling plate and a second cooling plate. A first part of the light sources are arranged on the first cooling plate and a second part of the light sources are arranged on the second cooling plate. The first and second cooling plates are separated by a distance and a flow channel is defined there between. The flow channel allows cooling fluid to flow between the first cooling plate and the second cooling plate whereby the light sources can be cooled by the cooling fluid. The heat sink comprises further a number of light passages allowing light to propagate from the second cooling plate, towards the first cooling plate and through the first cooling plate.

12 Claims, 10 Drawing Sheets

(51) Int. Cl.
*F21V 8/00* (2006.01)
*F21V 29/504* (2015.01)
*F21V 29/71* (2015.01)
*F21V 29/75* (2015.01)
*F21W 131/406* (2006.01)
*F21Y 105/00* (2016.01)
*F21Y 111/00* (2016.01)
*F21V 5/04* (2006.01)
*F21V 17/02* (2006.01)
*F21Y 113/00* (2016.01)
*F21V 29/81* (2015.01)

(52) U.S. Cl.
CPC ............ *F21V 29/504* (2015.01); *F21V 29/71* (2015.01); *F21V 29/75* (2015.01); *G02B 6/0013* (2013.01); *F21V 5/04* (2013.01); *F21V 5/048* (2013.01); *F21V 17/02* (2013.01); *F21V 29/81* (2015.01); *F21W 2131/406* (2013.01); *F21Y 2105/005* (2013.01); *F21Y 2111/008* (2013.01); *F21Y 2113/005* (2013.01)

(56) References Cited

U.S. PATENT DOCUMENTS

| 2005/0047135 | A1* | 3/2005 | Rhoads ............... H04N 9/3197 362/240 |
| 2007/0090737 | A1* | 4/2007 | Hu ............................ F21K 9/00 313/11 |
| 2007/0230185 | A1 | 10/2007 | Shuy |
| 2008/0013334 | A1 | 1/2008 | Lu et al. |
| 2008/0079012 | A1* | 4/2008 | Grote ................... B60Q 1/2696 257/89 |
| 2008/0165546 | A1* | 7/2008 | Lu ........................... F21S 4/003 362/373 |
| 2009/0046459 | A1* | 2/2009 | Ijzerman ................. F21V 7/06 362/240 |
| 2009/0268458 | A1 | 10/2009 | Feinbloom et al. |
| 2010/0001294 | A1 | 1/2010 | Faller et al. |
| 2010/0171403 | A1* | 7/2010 | Yang ........................ F21K 9/00 313/46 |
| 2010/0238394 | A1 | 9/2010 | Dunn |

OTHER PUBLICATIONS

European Search Report for Application No. EP 12 79 6259, dated Jan. 7, 2015.

* cited by examiner

ILLUMINATION DEVICE WITH MULTI-LAYERED HEAT SINK

FIELD OF THE INVENTION

The present invention relates to an illumination device where a number of light sources are arranged on a heat sink and adapted to emit light in substantially the same direction.

BACKGROUND OF THE INVENTION

In order to create various light effects and mood lighting in connection with concerts, live shows, TV shows, sport events or as a part on architectural installation light fixtures creating various effects are getting more and more used in the entertainment industry. Typically entertainment light fixtures creates a light beam having a beam width and a divergence and can for instance be wash/flood fixtures creating a relatively wide light beam with a uniform light distribution or it can be profile fixtures adapted to project image onto a target surface.

Light emitting diodes (LED) are, due to their relatively high efficiency and/or low energy consumption, long lifetime, and capability of electronic dimming, becoming more and more used in connection with lighting applications. LEDs are used in lighting applications for general illumination such as wash/flood lights illuminating a wide area or for generating wide light beams e.g. for the entertainment industry and/or architectural installations. For instance like in products such as MAC101™, MAC301™, MAC401™, Stagebar2™, Easypix™, Extube™, Tripix™, Exterior 400™ series provided by the applicant, Martin Professional a/s. Further LEDs are also being integrated into projecting systems where an image is created and projected towards a target surface. For instance like in the product MAC 350 Entrour™ provided by the applicant, Martin Professional a/s.

Different kinds of LEDs are currently commercially available. For instance LEDs may be provided as colored LEDs emitting light having a relatively narrow spectral bandwidth and thus emitting light of a single color. Typically LED based lighting products include a number of these LEDs of different colors and light generated by the LEDs are combined into an outgoing light beam. The intensity of each color can be adjusted relatively to each other whereby the color of the outgoing light beam can be varied as known in the art of additive color mixing. These lighting products can thus crate any color within the color gamut defined by the color of the LEDs. Typically this kind of lighting products includes red LEDs, green LEDs and blue LED and are known as RGB lighting products. The RGB lighting products can produce red, green and blue by turning the LED of only one color on while turning the remaining colors off. Further the RGB products can produce white light by turning all colors on (and approximately the same intensity) at the same time. However the color rendering index (CRI) of the white light is very low due the fact that the white is created by combining light with a narrow spectral bandwidth. The consequence is that an object illuminated by this white light, is not reproduced in its natural colors (as it appears when illuminated by sun light).

LEDs are also provided as white LEDs adapted to emit light having a broad spectral bandwidth and these may further be provided with different color temperature. These LED have a high CRI, as they emitted light over a large spectral bandwidth and are thus used in LED based lighting products to create bright white light, which can be used to illuminate objects and reproduce the objects in substantially in its natural color. However LED based lighting product based on white LEDs cannot create colored light beams without using a color filter as known in the art of subtractive color filtering.

RGBW LED based lighting products, where a number of single color LEDs and a number of white LEDs are combined, are also provided in order to be able to create different colors using additive color mixing and to improve the CRI of the white light. This is achieved by replacing a number of the colored LED with a number of the white LEDs. The white LEDs provide light having a broad spectral bandwidth and the CRI of the white light produced by such device is thus improved by white LEDs and the intensity of the white light is also increased. However the down side it that the intensity of the situated colors are reduced since there are fewer of these.

The LEDs are also provided in packages having a multiple amount a LED dies emitting light of different color and additionally also a led die emitting white light. The LED dies can be controlled individual, whereby the relative intensity of the light emitted by each die may be varied in relation to each other whereby the color of the outgoing light can be varied as known in the art of additive color mixing. Typically these LED packages includes a red die, green die, blue die and a white die and are known as RGBW 4in1 LEDs. The RGBW 4in1 LED are often used in RGBW LED based lighting products as described above.

In general it is desired to have a multi-colored LED lighting product with a high lumen and also a high CRI. However this is hard to achieve with the LED types describe above as it due to Etendue limitations is not possible to combine light from an unlimited amount of light sources into a light beam. The known LED based lighting products are as a consequence often designed for specific purposes and it is often necessary to have a large range of LED based lighting products in order to be able to provide a large variety of lighting solutions. This is especially the case in connection with projecting systems, where the light is coupled through an optical gate, where an image crating objects (GOBO) is positioned. An optical projecting system collect the light from the optical gate and is adapted to image the optical gate (and thus also the image crating object) a target surface. The light beam is very narrow when it passes the optical gate and such projecting systems are thus limited by Etendue. The Etendue, $E=A*\Omega$, at the gate through which light is emitted has a limited opening area A and the imaging optics only collect light from a limited solid angle $\Omega$. For light sources the Etendue can be calculated in the same way, where A is the radiating area, and $\Omega$ is the solid angle it radiates into.

It is desired to have very compact illumination devices which are difficult to achieve when more light sources are being integrated into the same illumination device. The space in light fixtures is often limited and it is difficult to fit many light sources into prior art fixtures, for instance because the optical components associated with the light sources often take up a lot of space. Another issue is the fact the light sources like LEDs generates heat which must be dissipated in order keep the LED running optimal. However it is difficult the remove the heat from the light sources in a compact illumination device, as the light sources are arranged in a small area wherefrom the head must be removed.

WO 2010/069327 discloses a moving head light fixture comprising a light generating head, where the head is carried in a yoke and rotatable to the yoke. The yoke is rotatable to a base. The head comprises at least one electronic circuit for LED control, where the moving head comprises a first cooling plate comprising a number of LEDs and a second cooling plate comprising the at least one electronic circuit for LED control. An air flow passage is running from at least one end of the moving head, through at least the first cooling plate and/or the second cooling plate and between the first cooling plate and the second cooling plate. The document discloses also to a cooling module for a moving head. This moving head provide an efficient cooling of the electronic circuits and the LEDs; however the moving head is relatively large and has a large cross sectional dimension.

US 2010/0238394 discloses a system for cooling an electronic display where an isolating structure may be used to allow ambient air to cool power modules. The isolating structure substantially prohibits containments which may be present within the ambient air from contacting sensitive electrical components on the power modules or otherwise. A gasket may be used to seal the interface between the power modules and the isolating structure. Heat sinks may be placed in thermal communication with the power supplies and fans may draw air through a narrow channel in which the heat sinks are located. In some embodiments the narrow channel may have the opposing surface of the channel defined by the rear portion of an LED assembly. Exemplary embodiments may use the ambient air to cool both the power modules and a closed loop of isolated gas within the electronic display.

DESCRIPTION OF THE INVENTION

The object of the present invention is to solve the above described limitations related to prior art. This is achieved by an illumination device comprising a heat sink and by a method as described in the independent claims. The dependent claims describe possible embodiments of the present invention. The advantages and benefits of the present invention are described in the detailed description of the invention.

DETAILED DESCRIPTION OF THE INVENTION

The present invention is described in view of an illumination device comprising a number of LEDs that generate a light beam, however the person skilled in the art realizes that the present invention can be embodied with any kind of light source generating heat such as discharge lamps, OLEDs, plasma sources, halogen sources, fluorescent light sources, etc can be used. Further it is to be understood that the illustrated embodiments only serve as illustrating examples illustrating the principles of the present invention and that the skilled person will be able to provide several embodiments within the scope of the claims. In the illustrated embodiments the illustrated light beams and optical means do only serve as to illustrate the principles of the invention rather than illustrating exact and precise light beams and optical means.

Figure 1A:
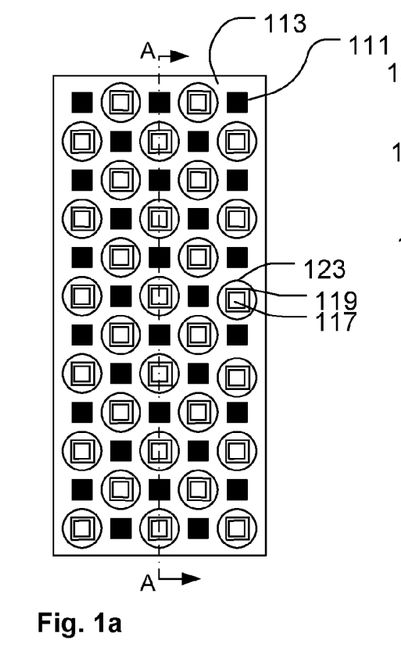
FIG. 1a-1c illustrate a simplified embodiment of an illumination device according to the present invention.
Figure 1B:
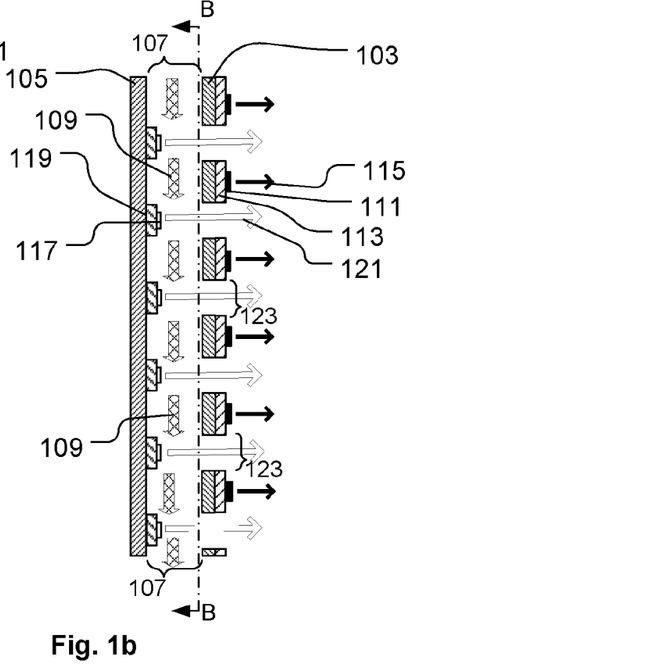
Figure 1C:
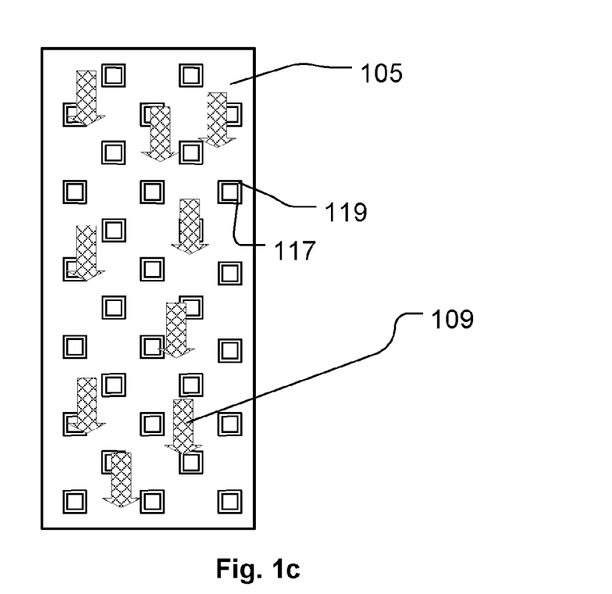
Figure 2A:
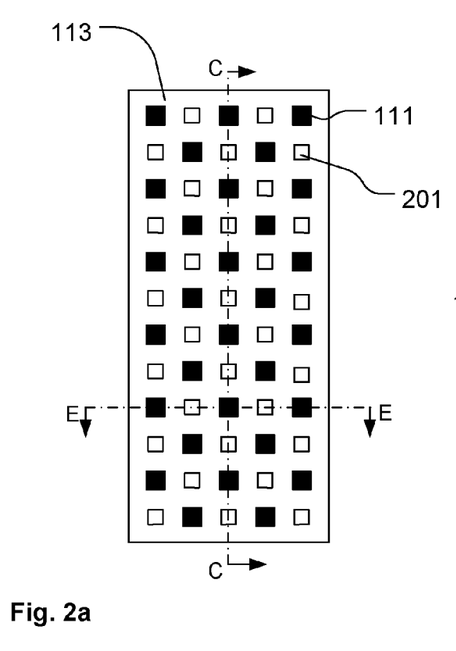
FIG. 2a-2d illustrate another simplified embodiment of an illumination device according to the present invention.
Figure 2B:
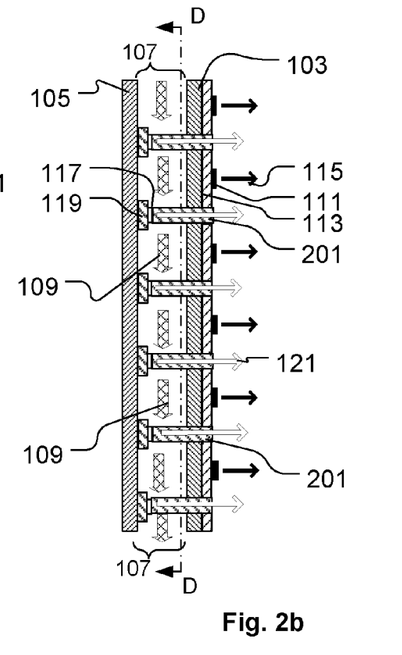
Figures 2C, 2D:
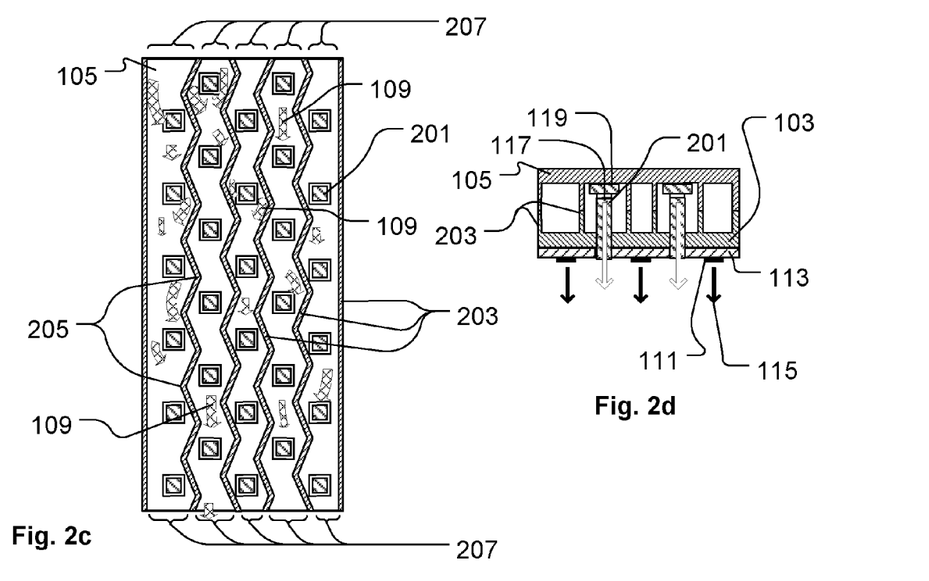
Figure 3A:
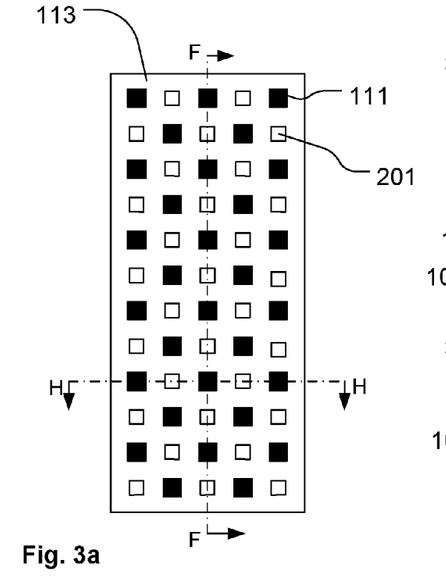
FIG. 3a-3d illustrate another simplified embodiment of an illumination device according to the present invention.
Figure 3B:
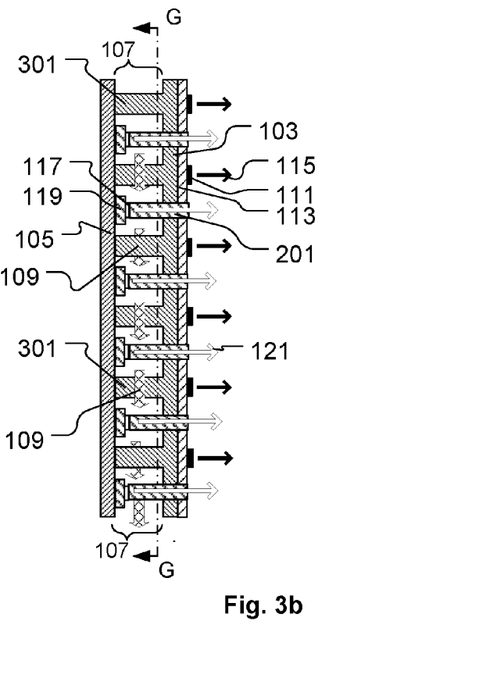
Figure 3C:
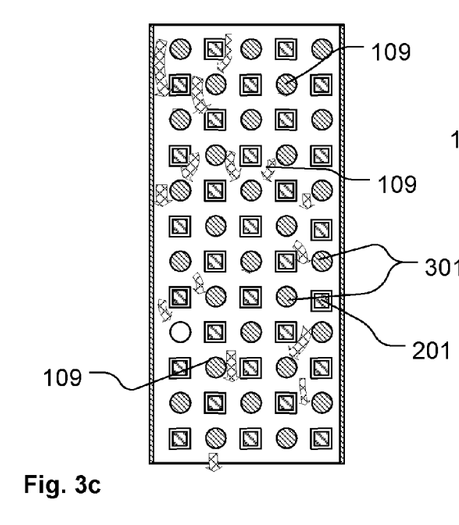
Figure 3D:
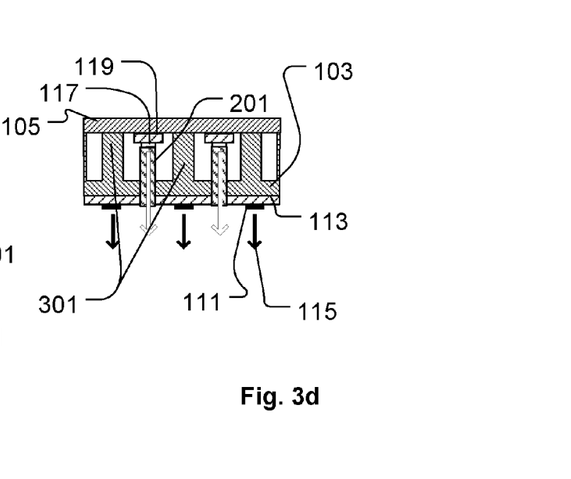

FIG. 1a-1c illustrate an illumination device according to the present invention and are respectively a front view, a cross-sectional view along line A-A and a cross-sectional view along line B-B.

The illumination device comprises a number of light sources arranged on a heat sink comprising a first cooling plate 103 and a second cooling plate 105. The first 103 and second 105 cooling plate are separated by a distance and forms a flow channel 107 there between. The flow channel 107 allows a cooling fluid to flow between the first cooling plate 103 and the second cooling plate 107 as illustrated by crosshatched arrows 109.

A first part 111 (illustrated in black quadrangles) of the light sources are arrange on the first cooling plate 103, for instance through a first PCB 113 which is in thermal contact with the first cooling plate 103. The first part 111 of light sources emits light in a direction away from the first cooling plate 103 as illustrated by black arrows 115.

A second part 117 (illustrated in white quadrangles) of the light sources are arranged on the second cooling plate 105 for instance through a number of second PCBs 119 which are in thermal contact with the second cooling plat 105. The first part 117 of light sources emits light in a direction away from the second cooling plate 105 as illustrated by white arrows 121. The heat sink comprises further at least one light passage 123 allowing light to propagate from the second cooling plate, towards the first cooling plate and through the first cooling plate. In the illustrated embodiment the light passages are embodied as a number of apertures in the first cooling plate 103 and the first PCB 113. The apertures are positioned above the second part 117 of the light sources and the light generated by the second part of the light sources will propagate in a direction away from the second cooling plate towards and through the first cooling plate 103 as illustrated by the white arrows 121. The skilled person realize that a part of the cooling fluid may escape the flow channel through these apertures which in case of cooling gas may resulting in a more efficient removal of the heat.

This makes it possible to construct a compact light engine where a large number of light sources can be efficiently cooled. This is achieved as the light sources are mounted on different cooling plates and at the same time adapted to emit light in the same direction. The light sources can be efficiently cooled as heat from the light sources can dissipate through the first and second cooling plate and be removed by cooling fluid flowing in the flow channel. Compared to the prior art where the light sources are arrange on the same cooling plate by separating the light sources into a first and second part arrange on respectively on the first and second cooling plate increases the amount of heat which can be dissipated as the surface through which the heat is dissipated is increased. Further the light sources can be arranged on the two cooling plates with a larger distance between the light sources which reduces the heat density in the cooling plate compared prior art, where the light sources are positioned very close to each other. The heat from the first part of the light sources will be dissipated backwards through the first cooling plate where it will be removed by the cooling fluid and the heat from the second part of the light sources will be dissipated sideward and forward through the second pooling plate where will be removed by the cooling fluid flowing in the flow channel. The cooling fluid can be any gas or liquid which can flow through the channel. The flow can be initiated by convection, gravity and/or by mechanical means like blowing means and pumping forcing the cooling fluid through the flow channel. The light passages allow the light generated by the second part light sources to be emitted in approximately the same direction as the light generated by the first part of the light sources. The consequence is that the light form the first part of the light sources and the second part of the light sources can be merged into one light beam. The cooling plates can be constructed in any thermal conducting material capable of dissipating heat for instance metal or ceramic material. The cooling plates can also be embodied as the PCBs whereon the LED are mounted. By separating the light sources onto the first cooling plate and second cooling plate makes it also possible to separate the most heat generating light sources and/or heat sensitive light sources form the less heat generating and/or heat sensitive light sources. For instance the most heat generating and/or heat sensitive light can be arranged at the most efficiently cooled cooling plate. For instance red LEDs are more heat sensitive than green LEDs and blue LEDs and the light output of red LEDs is as a consequence reduced faster when the temperature increases. The red LEDs in a RGB led illumination device can thus advantageously be arranged at the most efficient cooling plate where they can be cooled better. Further heat will not be able to dissipate from the green LEDs and blue LED to the red LED.

FIG. 2a-2d illustrates another embodiment of an illumination device according the present invention and are respectively a front view, a cross-sectional view along line C-C, a cross-sectional view along line D-D and a cross-sectional view along line E-E. This illumination device is substantial identical to the illuminating device in FIG. 1a-1c and reoccurring features are labeled with the same reference numbers as in FIG. 1a-1c. In this embodiment the light passages are embodied as a number of light guides 201 adapted to receive light generated by the second part 117 of the light sources and to transmit the received light towards and through the first cooling plate 103 as illustrated by the white arrows 121. The light guides 201 can for instance be embodied as a solid transparent material (e.g. glass or polymer) and be adapted to transmit the received light based on total internal reflection as known in the art of optics; however the light guides may also be embodied as light tunnels with reflective sidewalls. The cross section of the illustrated light guides are squared however it is to be understood that the cross-section can have any shape as long as the receive light is transmitted through the light guide. Further it is to be understood the cross section also may by changing along the light guide. The consequence it that a large amount of the light emitted by the second part 117 of the light sources can be transmitted towards and through the first cooling plate 103 where it can be emitted in the same direction as light from the first part 111 of light sources. Further the use of light guides makes it possible to prevent cooling fluid excepting the flow channel through first cooling plate like in the embodiment of FIG. 1a-1c, which can be a disadvantage in some cases, for instance in the case where the cooling fluid is a liquid, which is circulated through a liquid cooling system. In this way dust and moist which may be carried by the cooling fluid (e.g. when ambient/surrounding air is used as cooling fluid) can also be prevented from being build up in the light passages and at the light sources.

Further the first 103 and second 105 cooling plates comprises a number of cooling fins 203 which protrudes into the flow channel. The heat from the first and second cooling plates will dissipate into the cooling fins protruding into the flow channel. As a consequence more heat can be removed by the cooling fluid as the contact surface between the heat sink and cooling fluid is increased by the cooling fins. In illustrated embodiment the cooling fins 203 are interconnecting the first 103 and second 105 cooling plate along the flow direction and forms a number of flow sub-channels 207 wherein a part of the cooling fluid can flow as illustrated by the cross-hatched arrows 109 in FIG. 2c. Further the cooling fins 203 comprises a number of bends 205 which results in a turbulent flow of the cooling fluid through the flow sub-channels and the result is that more heat can be removed from the heat sink. The cooling fluid will also flow around the light guides 201 which also may result in turbulent flow.

It is noted that the cooling fins do not need to interconnect the first and second cooling plate and thus can be embodied as number of first cooling fins protruding into the flow channel from the first cooling plate and a number of second cooling fins protruding into the flow channel from the second cooling plate. The cooling fins can be shaped in many different forms and may be provided as straight fins, curved fins, oblong fins, pin fins, folded finds etc. The cooling fins can be embodied as separate objects which are thermally connected to the first and/or second cooling plates. However it is also possible to provide the cooling plates and cooling fins as integrated objects; for instance by molding the cooling plates and cooling. For instance the heat sink can be constructed by mounting the two cooling plates in a sandwich construction such that the cooling fins of the two plates are interconnected. It is noted that the person skilled in the art of cooling system can design the cooling fins in many ways in order to remove as much heat as possible.

FIG. 3a-3d illustrates another embodiment of an illumination device according the present invention and are respectively a front view, a cross-sectional view along line F-F, a cross-sectional view along line G-G and a cross-sectional view along line H-H. This illumination device is substantial identical to the previously described illuminating devices and reoccurring features are labeled with the same reference numbers. In this embodiment the first cooling plate comprises a number of pin fins 301 protruding backwards from the first cooling plate 103 (or forwards from the second cooling plate), further the pin fins are positioned below the light sources arranged at the first cooling plate. The consequence is that the heat generated by the first part 111 of the light sources can dissipate directly backwards into the flow channel where the cooling fluid can remove the heat. The cooling fluid will be able to flow through the flow channel in many directions as illustrated by the cross-hatched arrows 109 and turbulent flow can hereby be crated whereby more heat can be removed. The pin fins 301 are also in thermal contact with the second cooling plate and heat from the second part of the light sources can also dissipate into the pin fins. However it is noted that the second cooling plate also can comprise a number of pin fins protruding into the flow channel.

FIG. 4a-4d illustrates another embodiment of an illumination device according the present invention and are respectively a front view, a cross-sectional view along line I-I, a cross-sectional view along line J-J and a cross-sectional view along line K-K. This illumination device is substantial identical to the previously described illuminating devices and reoccurring features are labeled with the same reference numbers.

In this embodiment the cooling fins are embodied as hollow pin fins 401 which are adapted to surround the second part light sources. The hollow pin fins 401 acts in this way as light passage allowing light emitted by the second part light sources 117 to propagate from the second cooling plate 105, towards the first cooling plate 103 and through the first cooling plate as indicated by the white arrows 121.

For illustrative proposes different possible embodiments of the hollow pin fins are illustrated in FIG. 4*a*-*d*. The hollow pin fin labeled 401*a* is embodied as a part (for instance by molding) of the second cooling plate 105 and protrudes forwardly into the cooling channel and extends all the way through the cooling channel until it is thermal contact with the first cooling plate 103.

The hollow pin fin labeled 401*b* is embodied as a part (for instance by molding) of the second cooling plate 105 and protrudes forwardly into the cooling channel and extends all the way through the cooling channel, the first cooling plate 103 and the first PCB 113.

The hollow pin fin labeled 401*c* is embodied as a part of the first cooling plate 103 and protrudes backwardly into the flow channel and extends all the way through the flow channel until it is in thermal contact with the second cooling plate 105.

Like the hollow pin fins 401*c* the hollow pin fins labeled 401*d* are embodied as a part of the first cooling plate 103 and protrudes backwardly into the flow channel. However the hollow pin fins 401*d* are adapted to fit very closely around the second part light source and are further in thermal contact with the PCB 119.

Hollow pin fin labeled 401*e* are embodied as both a part of the first cooling plate 103 and as a part of the second cooling plate. A first part of the hollow pin fin labeled 401*e* protrudes backwardly form the first cooling plate 103 and a second part of the pin fins labeled 401*e* protrudes forwardly from the second cooling plate 105. The two parts meet inside the flow channel 107 where they are in thermal contact with each other.

Hollow pin fin labeled 401*f* is embodied as separate objects which are positioned inside the flow channel 107.

Figure 4A:
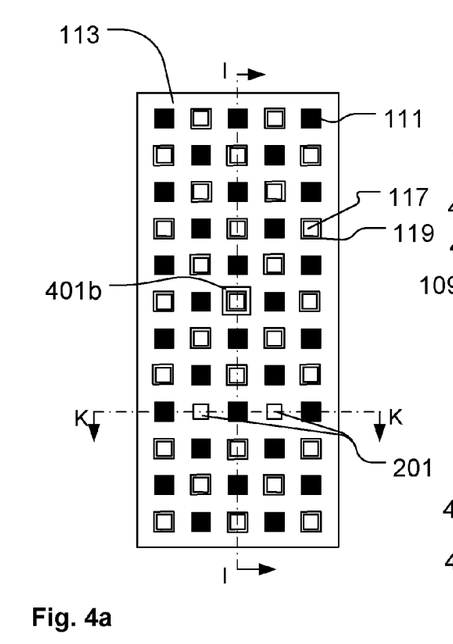
FIG. 4a-4d illustrate another simplified embodiment of an illumination device according to the present invention.
Figure 4B:
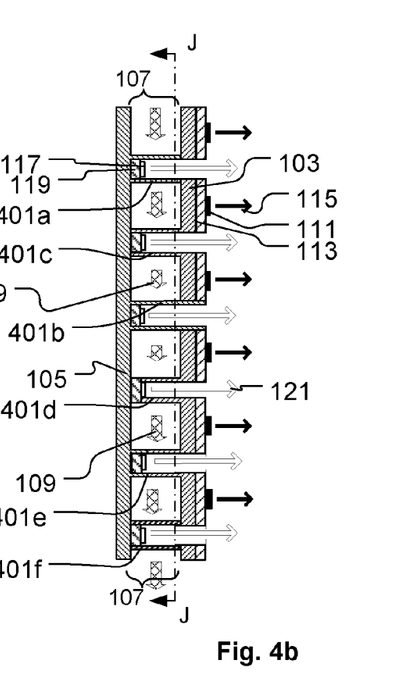
Figure 4C:
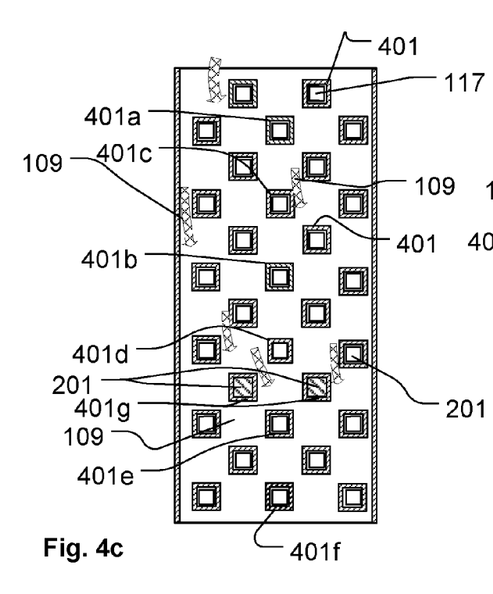
Figure 4D:
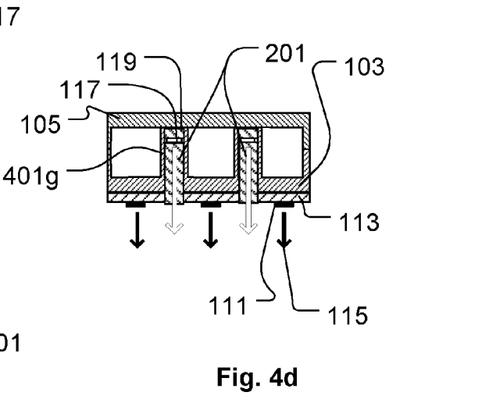

Pin fins 401*g* in FIG. 4*d* are adapted to surround a light guide 201 acting a light passage and can additionally also function as holding and/or aligning means adapted to hold and align the light guide 201 above the second part light sources 119.

The hollow pin fins are illustrated as having a squared cross section, however the skilled person realize that the cross section of the hollow pin fins can have any shape and may also vary along the hollow pin fin. The walls inside the hollow pin fin may further be covered by a reflective material adapted to reflect light hitting the internal walls and the hollow pin fins acts in this way as a light tunnel. Further the skilled person realize that the illustrated hollow pin fins only serve as illustrating examples and that they may be constructed in ways which differs from illustrated examples.

Figure 5A:
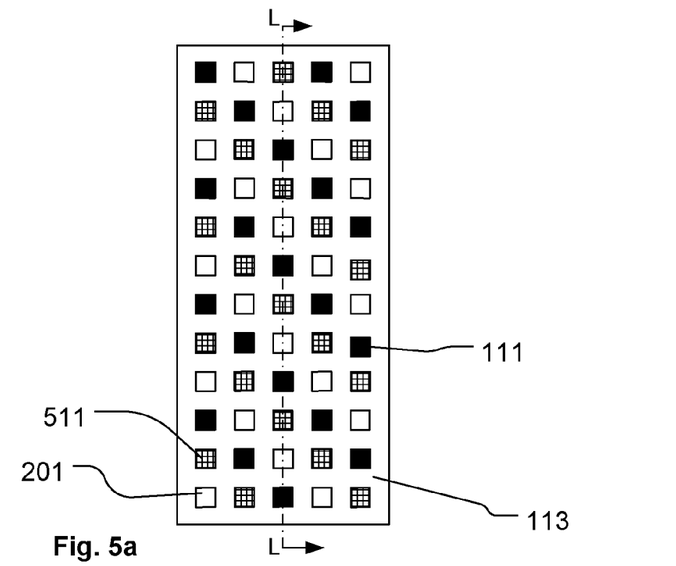
FIG. 5a-5b illustrate another simplified embodiment of an illumination device according to the present invention.
Figure 5B:
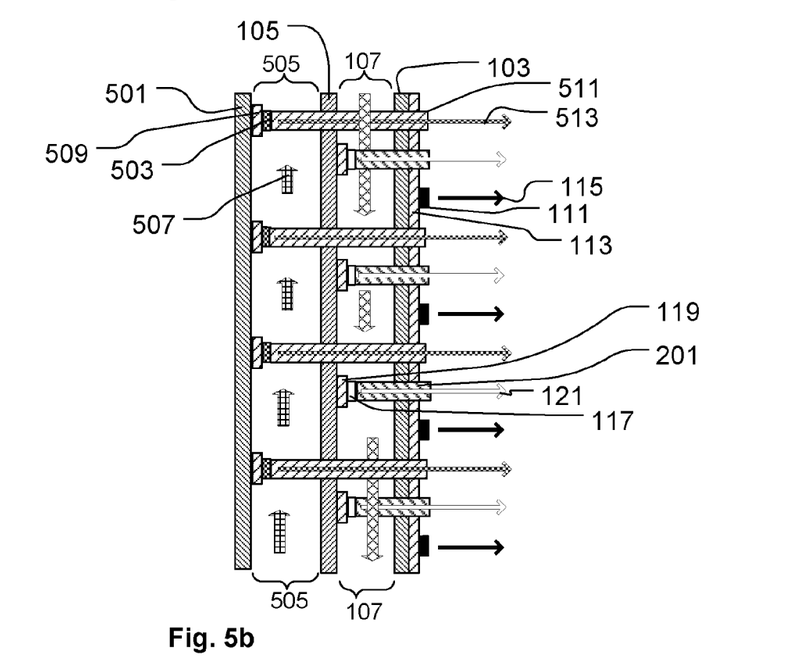

FIG. 5*a*-5*b* illustrate another embodiment of an illumination device according the present invention and are respectively a front view and a cross-sectional view along line L-L. This illumination device is substantial identical to the previously described illuminating devices and reoccurring features are labeled with the same reference numbers.

In this embodiment the illumination device comprises a third cooling plate 501 whereon a third part 503 (illustrated in shaded quadrangles) of the light sources are arranged. The second 105 and third 501 cooling plate are separated by a distance and form a second flow channel 505 there between. The second flow channel 503 allows a cooling fluid to flow between the second cooling plate 105 and the third cooling plate 501 as illustrated by squared-hatched arrows 507. The third part 503 (illustrated in shaded quadrangles) of the light sources are arranged on the third cooling plate 501 for instance through a number of third PCBs 509 which are in thermal contact with the third cooling plat 509. The heat sink comprises further at least one second light passage allowing light to propagate from the third cooling plate 501, towards and through the second cooling plate 105 and there from towards and through the first cooling plate 103.

In this embodiment the light passages are embodied as a number of light guides 511 adapted to receive light generated by the third part 117 of the light sources and to transmit the received light towards and through both the second 105 and first 103 cooling plates as illustrated by the shaded arrows 513. This skilled person realize the any number of additional cooling plates and light passages can be provide and that the illustrated embodiment can be combined with any of the technical features previous described.

Figures 6A, 6B:
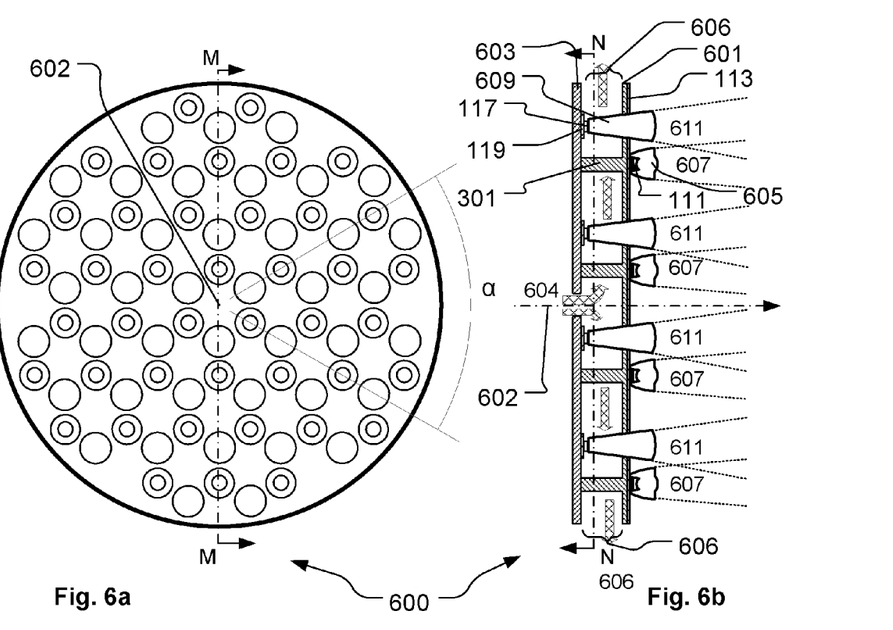
FIG. 6a-6c illustrate another simplified embodiment of an illumination device according to the present invention.
Figure 6C:
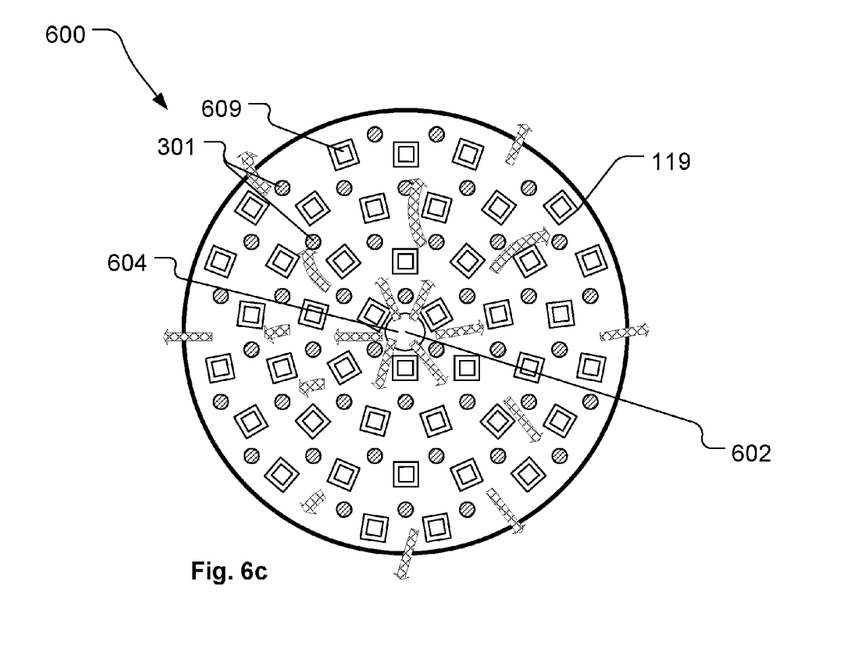

FIG. 6*a*-6*c* illustrate another embodiment of an illumination device according the present and are respectively a front view, a cross-sectional view along line M-M and a cross-sectional view along line N-N. This illumination device is substantial identical to the illuminating device FIG. 3*a*-*d* and reoccurring features are labeled with the same reference numbers as FIG. 3*a*-*d*.

In this embodiment the first 601 and second 603 cooling plates are circular shaped and the light sources 111 and 117 are distributed around an optical axis 602 going through the center of the circular shaped cooling plates 601 and 603. The first part 111 and the second part 117 of the light sources are arranged in substantially identical patterns. The two patterns are angular displaced around the optical axes and in relation to each other. The angular displacement a between the first part of light sources and the second part of light sources is 45 degrees, however the skilled person will realize they can be angular displaced in relation to each other at any angle.

The second cooling plate comprises an inlet 604 positioned at the center of the second cooling plate. The inlet 604 makes it possible introduce cooling fluid into an inner part of the flow channel 606 and let the cooling fluid flow outwards. In this embodiment the cooling channel is circular shaped and cooling fluid enter the flow channel at the center and there from flow outwardly from the center as illustrated by the cross-hatched arrows 109. It is to be understood that further inlets for cooling fluid can be introduced in the second cooling plate and/or also be embodied into the first cooling plate. The cooling fluid can for instance be forced through the inlet using blowing means, pumping means, pressing means etc. As described above the result is the very efficient cooling of the light sources is achieved.

The illumination device comprises further first intermediate light collecting means 605 positioned above the first part 111 of light sources. The first intermediate light collecting means are adapted to collect light form the first part of light sources and create a number of first intermediate light beams 607. The first intermediate light collecting means 605 are embodied as a number of TIR lenses. The illumination device comprises also second intermediate light collecting means 609 arranged in the light passages and above the second group of light sources 117. The second light collecting means 609 are embodied as light mixing rods adapted to collect and mix light from the second part of the light sources and convert the collected light into a number of second intermediate light beams 611.

Figure 7A:
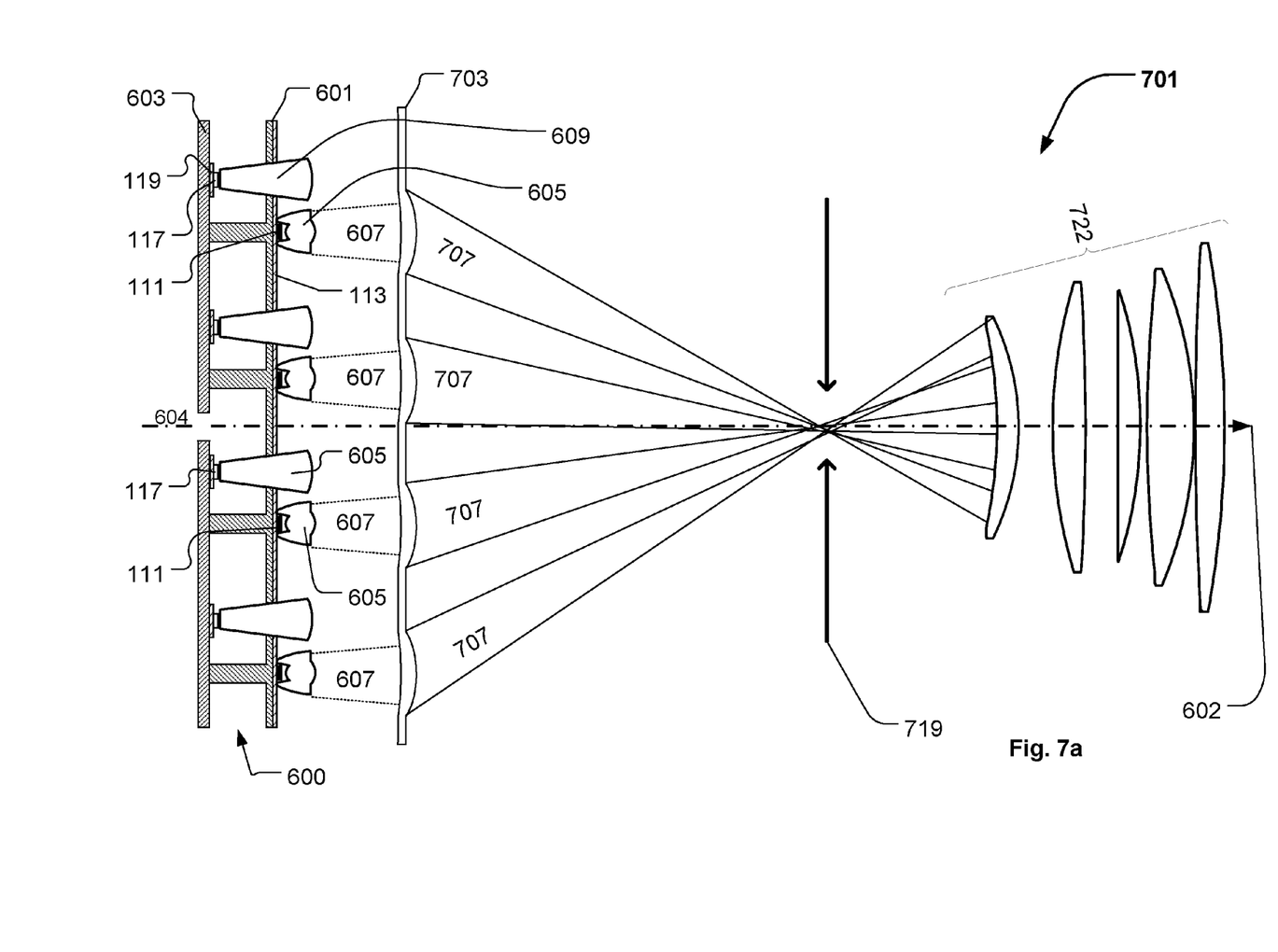
FIG. 7a-7d illustrate a projecting illumination device comprising an illumination device according to the present invention.
Figure 7B:
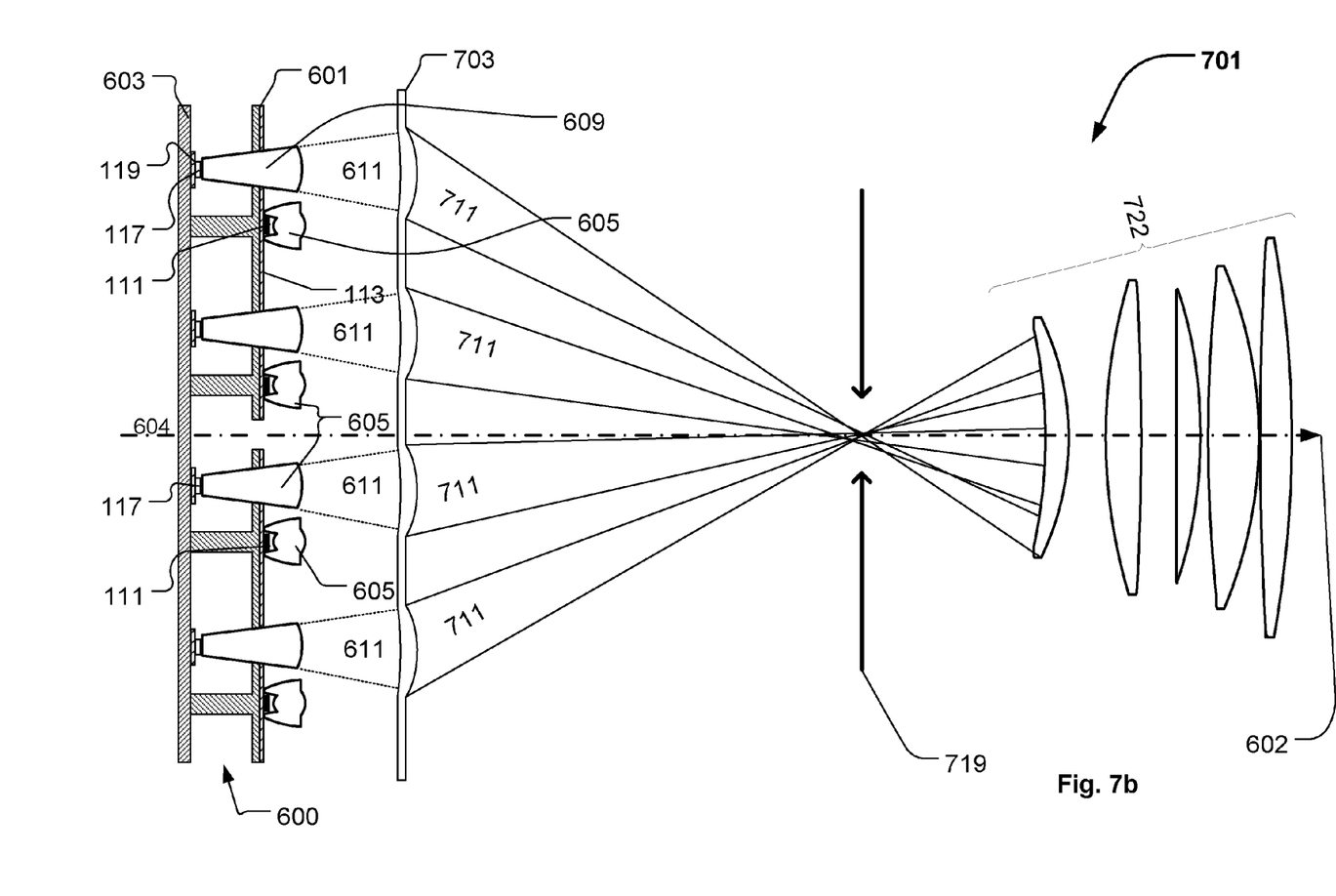
Figure 7C:
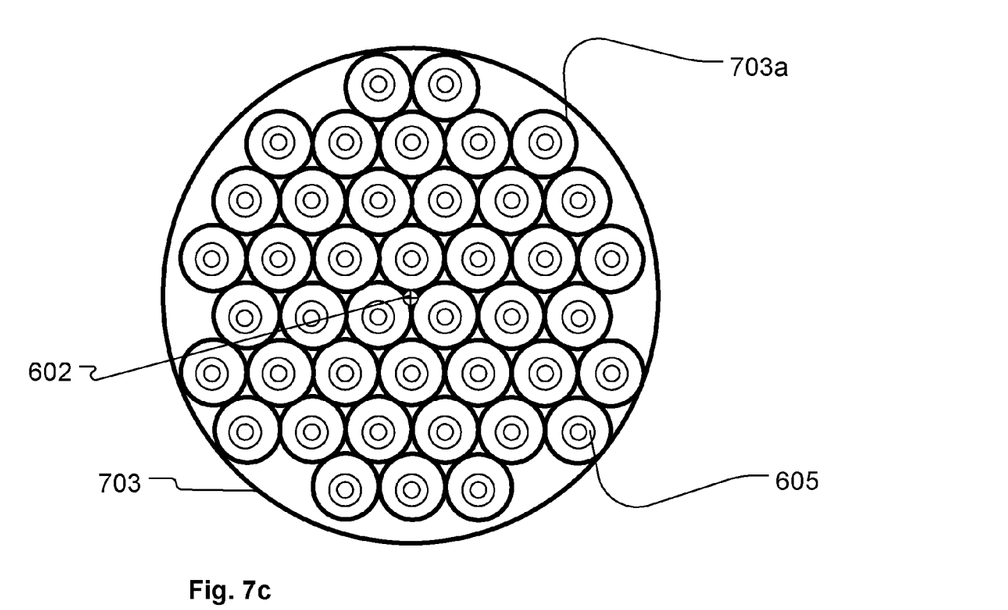
Figure 7D:
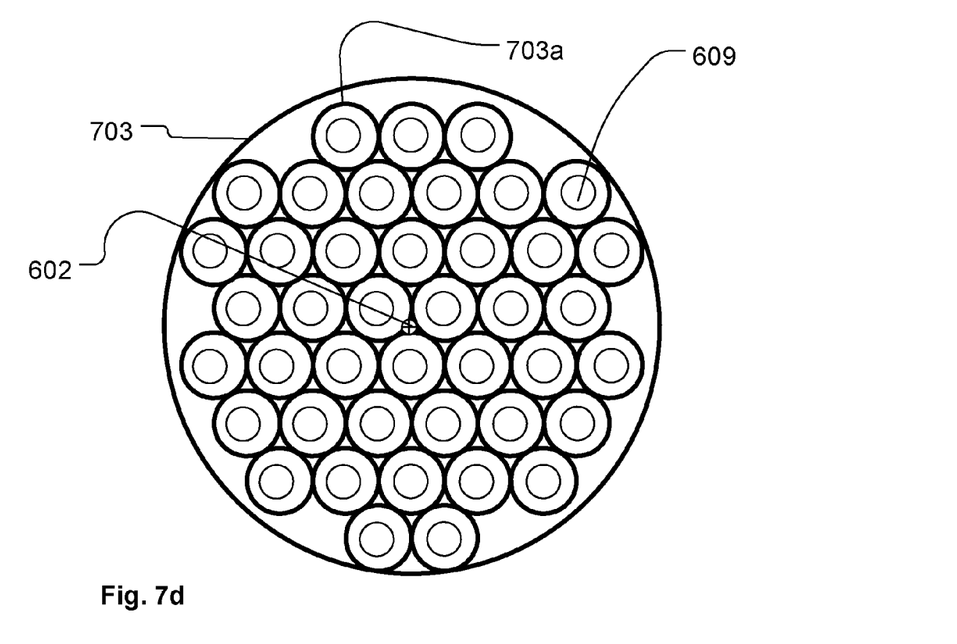

FIG. 7*a*-7*d* illustrates a projecting illumination device 701 where the illuminating device 600 in FIG. 6*a*-6*c* is used as light engine. FIGS. 7*a* and 7*b* are simplified cross sectional views and illustrate the light sources 111/117 and the light collecting means 707 respectively in a first position and in a second position. FIGS. 7*c* and 7*d* are front views of the light collecting means 703 respectively in the first position and in the second position.

In this embodiment a number of light collecting means 703 are arrange above the light sources 111/117 and the light collecting means 703 and light sources 111/117 are movable in relation to each other between the first position (FIGS. 7*a* and 7*c*) and the second position (FIGS. 7*b* and 7*d*). The light collecting means 703 are adapted to collect light from the light sources and convert the light into light beams.

In the first position the light generated by the first part of the light sources 111 will be converted into a number of first intermediate light beams 607 as described above and the intermediate light beams will be collected and converted into a first light beams 707 by the light collecting means 703.

Similar in the second position (FIGS. 7*b* and 7*d*) the light generated by the second part of the light sources 117 will be converted into a number of second intermediate light beams 609 as described above and the intermediate light beams will be collected and converted into a second light beams 709 by the light collecting means 703.

The first 111 and second 117 part of the light sources are further treated as a first and second group of light sources which can be controlled individually and independently of each other can thus be treated as two individually and independently groups of light sources. It is to be understood that the individually light sources of each groups can be controlled by the same control signal, be supplied with individual control signals and/or be grouped in sub-groups where each subgroup receive the same control signal This makes it possible to provide a multi-color illumination device with a high lumen output and high CRI. This is achieved as illumination device can be used in two modes of operations where the first group of light sources is used in the first mode of operation and where the second group of light sources is used in the second mode of operation. The shift between the two modes of operation can be performed by moving the light collecting means and the light sources in relation each other. The illumination device makes it possible to integrate a large number of light sources into one common illumination device without exceeding the Etendue limit, as only a sub-part of the light sources are used at the same time. Typically the physical dimensions of the light collecting means are larger than the physical dimension of the light source. This makes it possible provide a large number of light sources in an array and adapt the light collecting means only to collect light for some of the light sources. The light collecting means can be adapted to collect light form another part of the light sources by moving the light sources and the light collecting means in relation to each other and thereby choose which light sources are being used.

In a possible embodiment the first group of light sources can comprises a number of single color LED of different colors which makes it possible to provide a multi-color illumination device with very bright situated colors. The second group of light sources can then comprise a number of white LEDs which makes it possible to provide an illumination device having high lumen and high CRI. In this embodiment the illumination device can be switch between a multicolored illumination device (for instance a RGB device) with very bright saturated colors and a white illuminating device with a high CRI. The switching can be performed fast as the light collecting means and the light sources only need to be move a small distance in relation each other.

In another possible embodiment the first group of light sources can be embodied as a number of RGBW LEDs which acts at a multi-colored device where the additionally white led improves the CRI. The second group of light sources can then comprise a number of white LED which makes it possible to operate the illumination device as a very bright white illumination device. In fact the skilled person realizes that it is possible to combine the type of light sources of the first and second group of light sources as desired. Further it is also possible to provide additional groups of light sources and make the light collecting means movable into additional positions where the light collecting means collect light from the additional groups of light sources.

In the illustrated embodiment the light beams 707 and 711 propagate along an optical axis 602; meaning largest basis vector of a vector (typical 3D) defining the direction of propagation of the light beam is parallel with the optical axis 604. A long the optical axis the light beams 707 and 711 merge respectively into a first common light beam and a second common light beam. The first and second common light beams have a beam divergence determined by the characteristics of the light sources and the optical means.

The light collecting means 703 can be embodied as any optical component capable of collecting light from the light sources and convert the light into light beams and can for instance be optical lenses, light mixers, TIR lenses etc. In the illustrated embodiment the light collecting means 703 are embodied number of optical lenses molded in on piece of polymer as known in the prior art and the skilled person realizes that the optics can be designed according the light output of the light source and the descried optical properties of first light beams, second light beam 111, a first common light beam and/or second common light beam. The illumination device illustrated in FIG. 7*a* makes it thus possible to provide a multi-colored LED lighting product with a high lumen and also a high CRI.

The illustrated illumination device 701 is embodied as a projecting illumination device and light collecting means 703 are adapted to focus the first light beams 707 and second light beams 711 at an aperture 719 positioned along the optical axis 602. Further a projection system 722 is arranged along the optical axis 602 and is adapted to image the aperture 719 at a distance along the optical axis. This makes it possible to position an imaging object (not shown) approximately at the aperture and thereby create a projected image at a target surface a distance along the optical axis. The projecting system 722 can be moved along the optical axis 602 which makes it possible to focus the image at different distances as known in the art of zoom and focusing systems.

However it is to be understood that the illumination device alternatively can be embodied as a wash/flood light where the light collecting means 703 are adapted to create a common light beam from the first light beams 707 or the second light beams 711. Further the projection system 722 can be replaced by a zoom system adapted to change the divergence of the common light beam.

FIG. 7*c* illustrates that in the first position the light collecting means 703 are positioned above the first intermediate light collecting means 605 (illustrated by the fact that the exit surfaces of the first intermediate light collecting means are visible below the light collecting means 703 while the exit surface of the second intermediate light collecting means 609 are not visible). Similar in the second position illustrated in FIG. 7*d* the light collecting means 703 are positioned above the second intermediate light collecting means 609 (illustrated by the fact that the exit surface of the second intermediate light collecting means 609 are visible below the light collecting means 703 while the exit surface of the first intermediate light collecting means are not visible). From the first position in FIG. 7*c* to the second position in FIG. 7*d* the light collecting means 703 are rotated counter clockwise rotated around the optical axis 705 at an angle, which corresponds to angular displacement a between the two groups of light sources. As a consequence the collecting means 703*a* are moved from its position indicated in FIG. 7*c* to its position indicated in FIG. 7*d*. The first intermediate light collecting means and second intermediate light collecting means can be designed such the first intermediate light beams 607 and second intermediate light beans 611 has approximately the same beam diameter and diverges when they hit the light collecting means 703. The result is that the light beams coming leaving the light collecting means 703 will be substantial identical for the first and second position and the optical properties further along the optical axis can thus be the same which results in a very compact illumination device.

Figure 8:
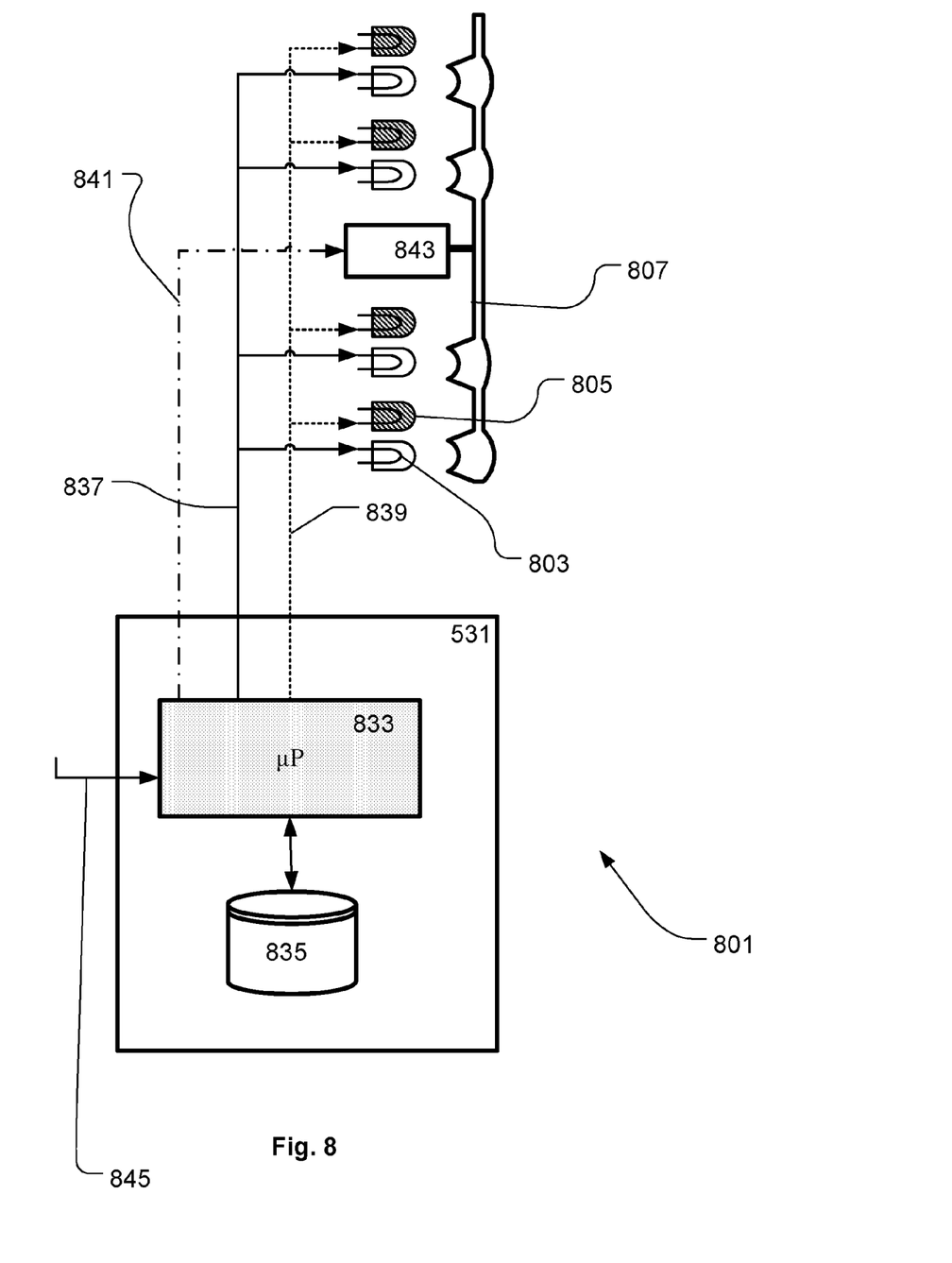
FIG. 8 illustrate a block diagram of the illumination device in FIG. 7a-7d.

FIG. 8 illustrates a block diagram of an illumination device according 801 the present invention. As described above the illumination device 801 comprises a number of light sources arranged in first group of light sources 803 (white) and in a second group of light sources 805 (hatched) and light collecting means 807. The illumination device comprises further a control unit 831 comprising a processor 833 and a memory 835. In the block diagram the light collecting means are positioned in the first position above the first group of light sources.

The processor acts as controlling means and is adapted to control the first group of light sources 803 and the second group of light sources 805 respectively through communication means 837 (in solid lines) and 839 (in dotted lines). Meaning the processing means can control one of the groups of light sources without controlling the other group of light sources. The controlling can for instance be adapted to control the color and/or intensity of the light sources and can be based on any type of communication signals known in the art of lightning e.g. PWM, AM, FM, binary signals etc. The first 803 and second 805 group of light sources can thus be controlled individually and independently of each other and can thus be treated as two individually and independently groups of light sources. It is to be understood that the individually light sources of each group can be controlled by the same control signal, supplied with individual control signals and/or grouped in sub-groups where each subgroup receive the same control signal. The communication means 837 and 839 are illustrated as a tree connection divided into the individual light source, however the person skilled person will be able to construct many embodiments of the communication means, for instance the group of light sources may be coupled in series or in parallel. Alternatively both groups of light sources can be connected to the same data bus and controlled by the controller through a data bus using addressing. Further the controlling means is adapted to control the light collector through communication means 841 (in dashed-dotted line by sending instructions to an actuator 843 adapted to move the light collecting means between the first and second position.

In one embodiment the controlling means is adapted to control the first group of light sources, second group of light sources and light collecting means 807 based on an input signal 845 indicative of a number of controlling parameters as known in the art of entertainment lighting. The input signal 845 can be any signal capable of communication parameters and can for instance be based on one of the following protocols USITT DMX 512, USITT DMX 512 1990, USITT DMX 512-A, DMX-512-A including RDM as covered by ANSI E1.11 and ANSI E1.20 standards or Wireless DMX. ACN designates Architecture for Control Networks; ANSI E1.17-2006).

The controlling means can be adapted to switch the illumination device between a first mode of operation and a second mode of operation. In the first mode of operation the light collecting means 807 and the light sources are arranged in the first position and the controlling means are adapted to control the first group of light sources while turning off the second group of light sources. In contrast hereto in the second mode of operation the light collecting means and the light sources are arranged in the second positioned and the controlling means are adapted to control the second group of light sources while turning off the first group of light sources. The input signal can be indicative of the mode of operation and the controlling means can be adapted to switch mode of operation based on the input single.

The invention claimed is:

1. An illumination device, comprising:
a plurality of light sources generating light, said light sources being arranged on a heat sink, wherein the heat sink comprises a first cooling plate and a second cooling plate;
wherein a first part of said light sources are arranged on said first cooling plate and a second part of said light sources are arranged on said second cooling plate;
wherein said first cooling plate and said second cooling plate are separated by a distance, and wherein a flow channel is defined between said first cooling plate and said second cooling plate, said flow channel allowing cooling fluid to flow between said first cooling plate and said second cooling plate; and
wherein said heat sink comprises further a plurality of light passages allowing light to propagate from said second cooling plate and towards said first cooling plate and further through said first cooling plate, and at least one of said light passages comprises at least one aperture in said first cooling plate.

2. An illumination device according to claim 1, wherein at least one of said light passages comprises a light guide, said light guide being adapted to collect at least a part of said light generated by said second part of said light sources and to transmit said collected light through the flow channel and said first cooling plate.

3. An illumination device according to claim 1, wherein said heat sink comprises a plurality of cooling fins protruding into said flow channel.

4. An illumination device according to claim 3 wherein at least one of said cooling fins interconnect said first cooling plate and said second cooling plate.

5. An illumination device according to claim 3, wherein at least one of said cooling fins comprises a pin fin positioned below one of the light sources of said first part of said light sources.

6. An illumination device according to claim 1, wherein at least one of said first cooling plate and said second cooling plate comprises an inlet where cooling fluid can be introduced into an inner part of the flow channel.

7. An illumination device according to claim 1, further comprising fluid forcing means adapted to force said cooling fluid through said flow channel.

8. A method of cooling a plurality of light sources emitting light, said method comprising the steps of:
- arranging a first part of said light sources on a first cooling plate;
- arranging a second part of said light sources on a second cooling plate;
- forming a flow channel between said first cooling plate and said second cooling plate by arranging said first cooling plate and said second cooling plate a distance separated from each other;
- cooling said light sources by allowing cooling fluid to flow through said flow channel; and
- emitting light in a first direction away from said first cooling plate by:
  - directing light generated by said first part of said light sources in said first direction; and
  - directing light generated by said second part of said light sources through a light passage in a direction away from said second cooling plate and towards said first cooling plate and further through said first cooling plate, wherein said step of directing light generated by said second part of said light sources comprises the step of directing said light generated by said second part of said light sources through an aperture in said first cooling plate.

9. A method according to claim 8, wherein said step of directing light generated by said second part of said light sources comprises the step of directing said light generated by said second light sources through a light guide.

10. A method according to claim 8, wherein said step of cooling said light sources comprises the step of forcing cooling fluid through said cooling channel using fluid forcing means.

11. An illumination device, comprising:
- a plurality of light sources generating light, said light sources being arranged on a heat sink, wherein the heat sink comprises a first cooling plate, a second cooling plate, and a plurality of cooling fins protruding into said flow channel, wherein at least one of said cooling fins comprises a hollow pin fin, wherein the hollow part of said hollow pin fin constitutes at least a part of one of said light passages;
- wherein a first part of said light sources are arranged on said first cooling plate and a second part of said light sources are arranged on said second cooling plate;
- wherein said first cooling plate and said second cooling plate are separated by a distance, and wherein a flow channel is defined between said first cooling plate and said second cooling plate, said flow channel allowing cooling fluid to flow between said first cooling plate and said second cooling plate; and
- wherein said heat sink comprises further a plurality of light passages allowing light to propagate from said second cooling plate and towards said first cooling plate and further through said first cooling plate.

12. An illumination device, comprising:
- a plurality of light sources generating light, said light sources being arranged on a heat sink, wherein the heat sink comprises a first cooling plate and a second cooling plate;
- wherein a first part of said light sources are arranged on said first cooling plate and a second part of said light sources are arranged on said second cooling plate;
- wherein said first cooling plate and said second cooling plate are separated by a distance, and wherein a flow channel is defined between said first cooling plate and said second cooling plate, said flow channel allowing cooling fluid to flow between said first cooling plate and said second cooling plate; and
- wherein said heat sink comprises further a plurality of light passages allowing light to propagate from said second cooling plate and towards said first cooling plate and further through said first cooling plate, wherein at least one of said light passages comprises a light guide, said light guide being adapted to collect at least a part of said light generated by said second part of said light sources and to transmit said collected light through the flow channel and said first cooling plate, wherein at least one of said light guides is arranged in one of said cooling fins, wherein the cooling fin comprises a hollow pin fin.

* * * * *